Jan. 25, 1955  R. V. ANDERSON  2,700,538
CENTRIFUGAL GOVERNOR
Filed Jan. 21, 1952

INVENTOR.
Robert V. Anderson
BY
ATTORNEY.

United States Patent Office 2,700,538
Patented Jan. 25, 1955

2,700,538

CENTRIFUGAL GOVERNOR

Robert V. Anderson, Oklahoma City, Okla.

Application January 21, 1952, Serial No. 267,321

1 Claim. (Cl. 264—15)

This invention relates to the field of power transmission and has included as one of its objects, the provision of novel mechanism for controlling the speed of rotation of a driven member notwithstanding variances in the speed of rotation of a second drive member coupled therewith.

This invention relates primarily to coupling the internal combustion engine of an automobile or the like with apparatus to be driven thereby. More specifically, the present invention has been developed for use in air conditioning of automobiles wherein it is desired to drive a compressor forming a part of the refrigerating system directly from the automobile engine. It is recognized at once that the speed of the engine varies considerably during normal use and accordingly, in order to provide a compressor capable of withstanding the abuse of high speeds, an expensive and virtually impractical type of compressor would have to be provided.

It is accordingly the most important object of the present invention to provide power transmitting mechanism adapted for interpositioning between the automobile engine and an ordinary low cost compressor, capable of limiting the speed of rotation of the compressor notwithstanding the variances in the speed of the automobile and particularly, the engine thereof.

It is another object of this invention to provide a variable speed hydraulic power transmitting mechanism responsive to the speed of rotation of the aforementioned compressor or the driven shaft coupled therewith and including a pair of wheel-like members, together with a centrifugal governor on the driven shaft for varying the distance between the members.

Other objects hereof are to provide a novel coupling arrangement between the governor and the movable turbine member; to provide novel wheel construction that includes a number of semi-circular plates or vanes; and to provide inexpensive, compact, trouble-free elements to produce the aforementioned result, all as will be made clear during the course of the following specification.

Figure 1:
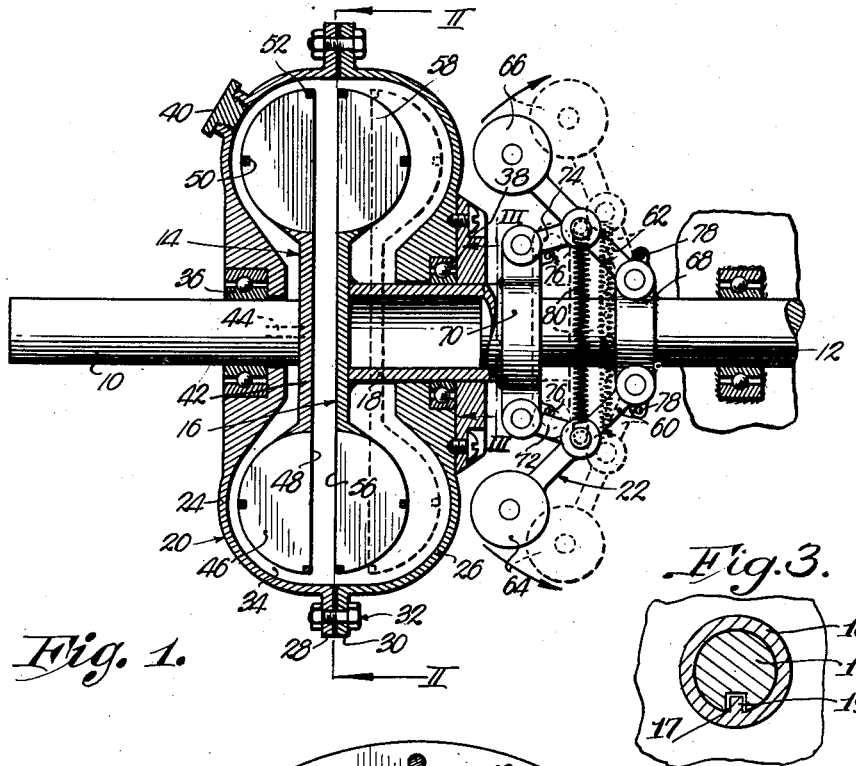
Figure 1 is a substantially central, cross-sectional view through the drive shaft and the driven shaft of power transmitting mechanism made pursuant to my present invention.

Inasmuch as the mechanism about to be described may have various applications other than for use in air conditioning of automobiles as above indicated, neither the internal combustion engine or other prime mover, nor the compressor or other structure to be driven, have been illustrated in the drawing. Accordingly, it is seen that the entire mechanism includes essentially a drive shaft 10, a driven shaft 12, a wheel or impeller 14 on the drive shaft 10, a second wheel or turbine 16 mounted on the driven shaft 12 through the medium of a sleeve or tube 18, a fluid housing 20, and a centrifugal-type governor broadly designated by the numeral 22.

Figure 3:
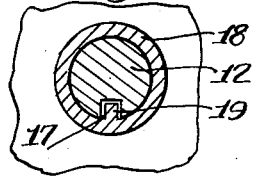
Fig. 3 is a fragmentary, detailed, cross-sectional view taken on line III—III of Fig. 1, looking in the direction of the arrows.
Figure 2:
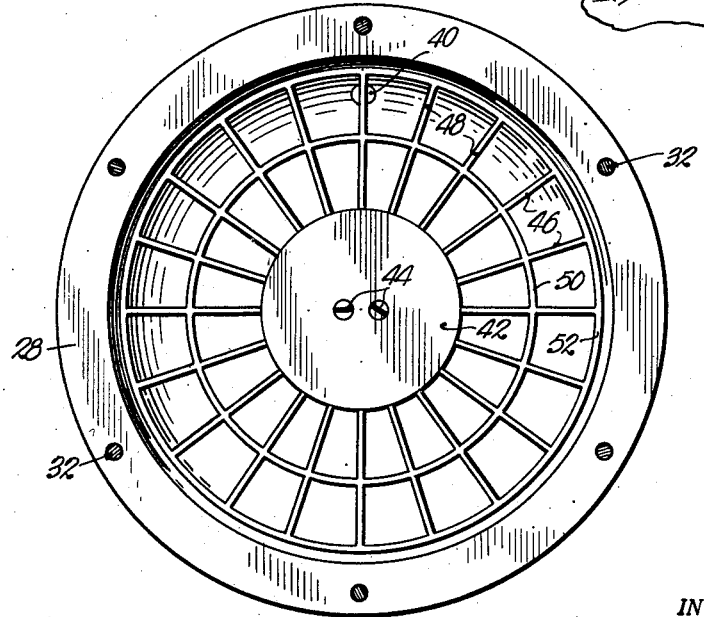
Fig. 2 is a cross-sectional view taken on line II—II of Fig. 1, looking in the direction of the arrows.

While the sleeve or tube 18 is slidable with respect to the shaft 12 longitudinally thereof, sleeve 18 and shaft 12 are interconnected for rotation together as shown in Fig. 3 of the drawing through use of a slot 17 in the shaft 12 extending longitudinally of the latter and an inwardly extending key 19 integral with the sleeve 18 and projecting into the slot 17.

The housing 20 comprises a pair of substantially identical sections 24 and 26 provided with out-turned, annular flanges 28 and 30 respectively, that are in face-to-face engagement and releasably interconnected through the medium of bolt and nut means 32. Housing 20 is accordingly substantially circular and has an annular chamber 34 surrounding the axes of rotation of shaft 10 and tube 18, and having an oval, transverse or cross-sectional contour. Bearings 36 and 38 within sections 24 and 26 respectively, receive the shaft 10 and the tube 18 respectively.

In this respect, and as will hereinafter be made clear, the tube 18 is also mounted for reciprocation on its longitudinal axis within the section 26 of housing 20 and therefore, a suitable sliding seal (not shown) may be provided in addition to the bearing 38. The section 24 should likewise be rendered leak-proof by a suitable seal surrounding the shaft 10, and since such seals are quite conventional, the same have not been illustrated.

The housing 20 is adapted to receive a suitable hydraulic fluid not shown, that is introduced through the medium of a fill plug 40 in the section 24.

The wheel or impeller 14 includes a flat, circular disc 42 secured directly to the innermost end of the drive shaft 10 by means of a number of screws or other fastening elements 44. A plurality of semi-circular vanes or plates 46 are welded or otherwise secured to the peripheral edge of the disc 42.

As is clear in the drawing, the plates 46 have their planes substantially within radii of the disc 42 and are disposed entirely to one side of the innermost face of the disc 42. Consequently, the straight edges 48 of the vanes 46 are coincident with the plane of the aforementioned innermost face of disc 42. Vanes 46 are strengthened or reinforced by means of a pair of annular bands 50 and 52, vanes 46 being notched to receive the bands 50 and 52. The wheel 16 is identical with the wheel 14 except that in lieu of the utilization of fastening elements 44, the disc 54 of wheel 16 is welded directly to the innermost end of the tube 18 to close the latter. The straight edges 48 and 56 respectively, are accordingly in facing relationship. It is seen that in operation, the vanes 46 and 58 rotate within the annular chamber 34 about the axes of shaft 10 and the tube 18.

The centrifugal governor 22 includes a pair of links 60 and 62 provided with counterweights 64 and 66 respectively on the outermost free ends thereof. The opposite ends of the links 60 and 62 are pivotally mounted for swinging movement on a bifurcated bracket 68 that surrounds the driven shaft 12 and is clamped rigidly thereto. A second bracket 70 surrounds the sleeve 18 exteriorly of housing 20 and is clamped thereto. The links 60 and 62 are pivotally joined to the clamp 70 by means of short links 72 and 74 respectively. The counterweights 64 and 66 swing toward and away from each other as indicated by the arrows and dotted lines in Fig. 1 of the drawing in response to the speed of rotation of driven shaft 12.

In operation, at the beginning of rotation of shaft 10, the wheels 14 and 16 are relatively close together and the counterweights 64 and 66 are substantially as illustrated by full lines in Fig. 1 of the drawing. Rotative motion is transmitted from the drive shaft 10 to the driven shaft 12, through the hydraulic fluid within housing 20 and as the speed of rotation of shaft 10 increases to thereby increase the speed of rotation of driven shaft 12, centrifugal force operating upon the governor 22, causes the links 60 and 62 to swing toward the dotted line position of Fig. 1. Such swinging movement of links 60 and 62 imparts a pulling force upon the sleeve or tube 18, thereby moving the wheel 16 away from the wheel 14. Thus, by proper choosing of the governor 22, the maximum speed of rotation of the shaft 12 prior to movement of the wheel 16, away from the wheel 14, may be predetermined.

Increased speeds of rotation of the drive shaft 10 above a predetermined value, will not be imparted to the driven shaft 12 and accordingly, when the latter is utilized to drive a refrigerating compressor as above mentioned, the high speeds of the internal combustion engine of the automobile will not operate to damage the compressor.

Stops 76 on the bracket 70 within the path of travel of links 72 and 74 limit the extent of movement of the wheel 16 toward the wheel 14, and the extent of movement of counterweights 64 and 66 toward the housing 20. Conversely, stops 78 on bracket 68 within the path of travel of links 60 and 62 limit movement of wheel 16 away from wheel 14 and determine the extent of movement of counterweights 64 and 66 in the direction of the arrows in Fig. 1.

Stops 76 therefore, predetermine maximum efficiency at low speeds, by fixing the relative distance between the primary wheel 14 and the secondary wheel 16. The governor flyweights 64 and 66 are of such weight, that with a spring 80 interconnecting the same, the governor 22 will, at low speeds return to the closest or most efficient position of the blades 46 and 58.

As the speed of turbine 16 increases, or decreases, in accordance with the speed of the impeller 14 and the torque requirement of a unit coupled with shaft 12, the transmission of power from the impeller 14 to the turbine 16, through the oil media in housing 20, is constant, with a minimum amount of slippage at low speeds. As such speed increases to move blades 58 away from blades 46 there is an increase in eddy currents and slippage within housing 20, reducing the speeds of the turbine 16 as a function of the resistant torque required for the successful operation of a unit attached to shaft 12.

With links 72 and 74 against stops 76, governor 22 is set, by choosing weights 64 and 66, and spring 80, at the most efficient operating speed of a unit on shaft 12. As the speed of shaft 10 exceeds this value, the links 72 and 74 will move away from stops 76 only as far as the resistant torque requires, thereby maintaining a predetermined speed in shaft 12 less than the speed of shaft 10. Conversely, as long as the speed of shaft 10 is above the most efficient speed of a unit attached to shaft 12, increased torque requirements in the unit will cause weights 64 and 66 to swing toward housing 20, again automatically maintaining a predetermined speed in shaft 12.

It is seen that the transmission mechanism hereof is entirely automatic and that therefore, no operator attention is required to vary the relative speeds of rotation of the drive shaft and the driven shaft. The entire mechanism is simple, inexpensive and easily maintained.

Accordingly, while changes and modifications may be made within the spirit and scope of this invention, those that fairly come within the concepts hereof, are contemplated hereby, and it is desired to be limited only by the scope of the appended claim.

Having thus described the invention what is claimed as new and desired to be secured by Letters Patent is:

Governor apparatus for automatically reciprocating a tube axially relative to a shaft upon which the tube is slidably telescoped responsive to changes in the speed at which the tube and shaft are being simultaneously rotated, said apparatus comprising a first bracket rigidly mounted on the tube adjacent an extremity thereof; a second bracket rigidly mounted on the shaft in spaced relationship to said extremity of the tube; a number of relatively short and long links, each of said short links being pivotally attached at one end thereof to the first bracket and extending beyond said extremity of the tube in a direction diverging from the axis of the shaft as the opposite end of the link is approached; a relatively long link for each short link respectively, each of said long links being pivotally attached at one end thereof to the second bracket and extending angularly toward a corresponding short link in a direction diverging from the axis of the shaft as the opposite end of the long link is approached; a counterweight on said opposite end of each long link; a pivot pin for each short link respectively interconnecting the latter at its said opposite end with the corresponding long link intermediate the ends of the latter; resilient means yieldably biasing each of said pins toward the shaft; a stop on the first bracket for each short link respectively, each of said stops being disposed between a corresponding short link and the shaft for limiting inward swinging movement of the counterweights toward the axes of the shaft and the tube; and a stop on the second bracket for each long link respectively, each of said long links passing between a corresponding one of the last-mentioned stops and the shaft for limiting outward swinging movement of the counterweights away from the axes of the shaft and tube, whereby, as the speed of rotation of the tube and shaft is decreased, the shaft will be further withdrawn from the tube and, as the speed of rotation of the tube and shaft is increased, the shaft will be further telescoped into the tube.

References Cited in the file of this patent

UNITED STATES PATENTS

| Number | Name | Date |
| --- | --- | --- |
| 491,829 | Williams | Feb. 14, 1893 |
| 621,871 | Tolle | Mar. 28, 1899 |
| 1,077,695 | Foster | Nov. 4, 1913 |
| 2,130,895 | Ness | Sept. 20, 1938 |
| 2,336,167 | Dillon | Dec. 7, 1943 |
| 2,436,412 | Zeidler | Feb. 24, 1948 |